United States Patent
Lim et al.

(10) Patent No.: US 9,476,977 B2
(45) Date of Patent: Oct. 25, 2016

(54) METEOROLOGICAL OBSERVATION SYSTEM USING VEHICLES

(71) Applicant: KOREA INSTITUTE OF CONSTRUCTION TECHNOLOGY, Goyang-si (KR)

(72) Inventors: Sang Hun Lim, Goyang-si (KR); Dong Ryul Lee, Seoul (KR)

(73) Assignee: KOREA INSTITUTE OF CONSTRUCTION TECHNOLOGY (KR)

( * ) Notice: Subject to any disclaimer, the term of this patent is extended or adjusted under 35 U.S.C. 154(b) by 291 days.

(21) Appl. No.: 14/294,580

(22) Filed: Jun. 3, 2014

(65) Prior Publication Data
US 2015/0061929 A1    Mar. 5, 2015

(30) Foreign Application Priority Data
Aug. 30, 2013 (KR) .......................... 10-2013-0103678

(51) Int. Cl.
| | |
|---|---|
| *G01S 13/95* | (2006.01) |
| *G01S 13/86* | (2006.01) |
| *G01S 7/00* | (2006.01) |
| *G01S 13/93* | (2006.01) |

(52) U.S. Cl.
CPC .............. *G01S 13/956* (2013.01); *G01S 7/003* (2013.01); *G01S 13/86* (2013.01); *G01S 13/867* (2013.01); *G01S 13/931* (2013.01)

(58) Field of Classification Search
CPC .............. G01S 13/95–13/958; G01S 13/867; G01S 13/86; G01S 7/003; G01S 13/931; G01S 2013/9314–2013/9396
See application file for complete search history.

(56) References Cited

U.S. PATENT DOCUMENTS

| | | | | |
|---|---|---|---|---|
| 6,418,371 | B1 * | 7/2002 | Arnold ..................... | G08G 1/08 340/905 |
| 8,558,730 | B2 * | 10/2013 | Hassen ................... | G01S 7/411 342/118 |
| 8,836,572 | B2 * | 9/2014 | Heilmann ................ | G01S 7/41 342/26 R |
| 9,116,241 | B2 * | 8/2015 | Bechler ................. | G01S 13/931 |

* cited by examiner

*Primary Examiner* — Matthew M Barker
(74) *Attorney, Agent, or Firm* — Cantor Colburn LLP

(57) ABSTRACT

Disclosed herein is a meteorological observation system using vehicles. The meteorological observation system using vehicles includes a meteorological observation device embedded in each of the vehicles and configured to periodically detect surrounding weather information and to photograph weather conditions, the vehicle configured to run on a road using radar devices for detecting the front and right and left sides of the vehicle, that is, sensors for supporting driving and prevent a collision, and to provide mobility to the meteorological observation device, a meteorological server configured to collect pieces of the weather information from the meteorological observation devices moving in respective areas through wireless communication and to provide the pieces of weather information to a meteorological observation center, the meteorological observation center configured to use information, received from the meteorological server, as statistical data or meteorological observation and forecast data.

11 Claims, 8 Drawing Sheets

METEOROLOGICAL OBSERVATION SYSTEM USING VEHICLES

CROSS REFERENCE TO RELATED APPLICATION

The present application claims the benefit of Korean Patent Application No. 10-2013-0103678 filed in the Korean Intellectual Property Office on Aug. 30, 2013, the entire contents of which are incorporated herein by reference.

BACKGROUND OF THE INVENTION

1. Technical Field

The present invention relates to a meteorological observation system and, more particularly, to a meteorological observation system using vehicles.

2. Description of the Related Art

As a vehicle has recently emerged as one of the essential goods of life as well as the industrial world, traffic accidents very frequently occur due to a sudden increase of the vehicles globally, Accordingly, the improvement of safety of the vehicle has emerged as an important issue.

A passive type vehicle safety system using air bags and safety belts for minimizing damage attributable to traffic accidents is gradually changed to an active type vehicle safety system using an Automatic Braking System (ABS), a vehicle-to-vehicle distance alarm system, and side/rear surveillance radars capable of preventing an accident.

The International Telecommunication Union Radiocommunication sector (ITU-R) recommends several items related to Transport Information and Control Systems (TICS). TICS is a system in which computer, communication, location information and vehicle technologies integrated in order to improve the safety and efficiency of a ground traffic system and a method of operating the ground traffic system.

An Advanced Vehicle Control Systems (AVCS) that belongs to TICS and that relates to the direct driving of a vehicle has several points required to prevent a collision. A radar for a vehicle is one of technologies that may be applied to the safe driving of a vehicle through the assistance of a driver.

A radar for a vehicle using a radar was commercialized in Japan in the early 1980s, but the radar was too sensitive to several weather conditions (e.g., vulnerable to contamination, such as soil and dust). Accordingly, a method using millimeter waves is widely used. Active researches is carried out on a radar for a vehicle using millimeter waves is characterized in that the radar has relatively small errors and may be easily used even in several weather conditions in terms of its application. Millimeter waves mean electromagnetic waves whose frequency wavelength is a millimeter unit of 30 to 300 GHz.

A band of 24 GHz for the near/middle distance is partially used in a radar sensor for detecting the front using millimeter waves, but active researches is carried out on a radar sensor for detecting the front, which has a band of 77 GHz for the long distance (e.g., a maximum of about 200 m). In relation to standardization, ITU Radiocommunication Assembly (RA-2000) in Turkey on May, 2002 recommended bands of 60 GHz and 76 GHz for a radar for a vehicle. In Korea, in accordance with Article 9 of Radio Regulation Law on April, 2001, Notification No. 2001-21 of the Ministry of Information and Communication has distributed and announced a band of 76 to 77 GHz into frequencies for a vehicle radar for a specific small-output radio station. Today, a technical reference guideline for a radar for detecting the front in Korea has been provided.

Furthermore, the frequencies of several bands, such as 47 GHz, 60 GHz, 77 GHz, 94 GHz, and 139 GHz, are being used by taking into consideration a small size for mounting on a vehicle, high resolution, and propagation interference with existing wireless systems. In common visibility communication, a loss characteristic according to the frequencies is present with respect to air and vapor.

In weather conditions, such as rainfall or snow fall, a radio wave used in a radar for a vehicle generates considerable attenuation. The attenuation of a radio wave used in a radar for a vehicle that is generated in weather conditions, such as rainfall or snow fall, acts as an error in a radar sensor for preventing a collision, but may be used as a criterion for estimating the amount of rainfall because the attenuation is regularly increased or decreased depending on the amount of rainfall.

Recently, researches is gradually carried out on the attenuation characteristic of a radio wave for a vehicle radar in the vehicle radar application technology field and the meteorological observation field.

SUMMARY OF THE INVENTION

Accordingly, the present invention has been made keeping in mind the above problems occurring in the prior art, and an object of the present invention is to provide a meteorological observation system and method for collecting pieces of weather information detected by vehicles and performing meteorological observations and forecast using the collected pieces of weather information.

Another object of the present invention is to provide a meteorological observation system for measuring the amount of rainfall in an area to which a corresponding vehicle moves using attenuation generated by the radio waves of a radar for a vehicle in weather conditions, such as rainfall or snow fall.

The objects and other advantages of the present invention may be implemented by structures written in the claims in addition to the following description and the accompanying drawings.

Additional characteristics and advantages of the present invention will be described in the following description, and will be partially made evident by the description or understood by the implementation of the present invention. In particular, the objects and other advantages of the present invention may be implemented by structures written in the claims in addition to the following description and the accompanying drawings.

In accordance with an aspect of the present invention, a meteorological observation system using vehicles is configured to include a meteorological observation device embedded in each of the vehicles and configured to periodically detect surrounding weather information and to photograph weather conditions, the vehicle configured to run on a road using radar devices for detecting the front and right and left sides of the vehicle, that is, sensors for supporting driving and prevent a collision, and to provide mobility to the meteorological observation device, a meteorological server configured to collect pieces of the weather information from the meteorological observation devices moving in respective areas through wireless communication and to provide the pieces of weather information to a meteorological observation center, the meteorological observation center configured to use information, received from the meteorological server, as statistical data or meteorological observation and forecast data.

The meteorological observation device may be configured to include a sensor unit configured to detect temperature, humidity, wind speed, the direction of the wind around the vehicle being driven, a radar unit configured to output the signals of specific frequencies toward the front or right and left sides of the vehicle in order to measure the distance between the vehicle being driven and another vehicle which is driven ahead of the vehicle being driven, a control unit configured to estimate the amount of rainfall or the amount of snow fall using a loss characteristic of radio waves output by the radar unit, a photographing unit configured to photograph scenes around the vehicle being driven and to generate an image on which weather conditions of a corresponding area are able to be diagnosed, a memory unit configured to store the weather information detected by the sensor unit and the control unit and image information provided by the photographing unit, and a communication unit 160 configured to send the information stored in the memory unit to the meteorological server at a remote place.

The radar unit may be configured to include a first radar unit configured to output a frequency of 77 GHz toward the front of the vehicle and second radar units configured to output a frequency of 24 GHz toward the left and right sides of the vehicle.

In accordance with another aspect of the present invention, a meteorological observation method using vehicles includes running, by each of the vehicles on each of which an AVCS is mounted, on a road using radar devices for detecting front and right and left sides of the vehicle in order to support driving and prevent a collision, periodically detecting, by a meteorological observation device embedded in the vehicle, surrounding weather information and photographing weather conditions, collecting, by a meteorological server, pieces of weather information and captured images from the meteorological observation devices for the vehicles that are moving in respective areas through wireless communication, providing the pieces of collected information to a meteorological observation center, and using, by the meteorological observation center, information received from the meteorological server as statistical data or meteorological observation and forecast data.

Detecting the surrounding weather information and photographing the weather conditions may include detecting, by a sensor unit, temperature, humidity, wind speed, the direction of the wind around a vehicle being driven, estimating the amount of rainfall using a loss characteristic of radio wave of a radar unit configured to output the signals of specific frequencies toward the front or right and left sides of the vehicle in order to measure the distance between the vehicle being driven and another vehicle which is driven ahead of the vehicle being driven, and photographing the weather conditions around the vehicle being driven.

| <Description of reference numerals of principal elements in the drawings> | |
|---|---|
| 100: meteorological observation device | |
| 110: sensor unit | 120: radar unit |
| 124: first radar unit | 128: second radar units |
| 120a: antenna | 120b: RF unit |
| 120c: digital signal processor | |
| 120d: recognition unit | |
| 130: photographing unit | 140: control unit |
| 150: memory unit | 160: communication unit |

DETAILED DESCRIPTION

Hereinafter, some embodiments of the present invention will be described in detail with reference to the accompanying drawings.

It is to be noted that in assigning reference numerals to elements in the drawings, the same reference numerals denote the same elements throughout the drawings even in cases where the elements are shown in different drawings. Furthermore, in describing the embodiments of the present invention, a detailed description of the known functions and constitutions will be omitted if it is deemed to make the gist of the present invention unnecessarily vague.

The point of the present invention is to implement a meteorological observation system and method for estimating the amount of rainfall using vehicles and detecting weather information (e.g., temperature, humidity, wind speed, and the direction of the wind).

Figure 1:
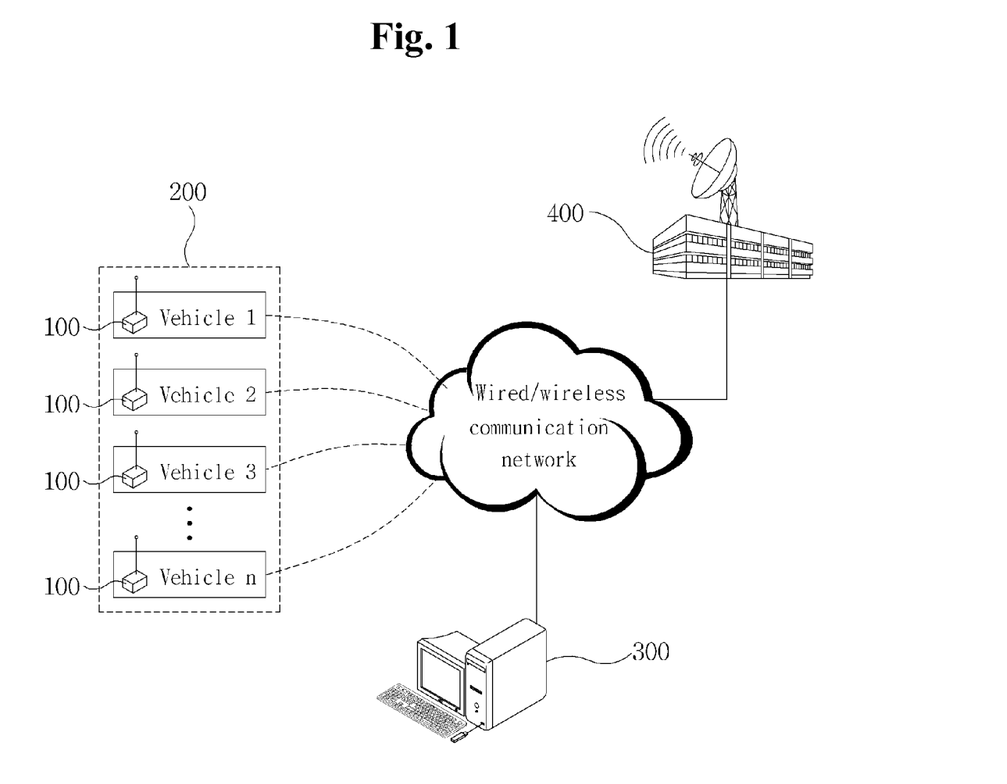
FIG. 1 is a block diagram illustrating the construction of a meteorological observation system in accordance with an embodiment of the present invention.

FIG. 1 is a block diagram illustrating the construction of the meteorological observation system in accordance with an embodiment of the present invention.

As shown in FIG. 1, the meteorological observation system in accordance with an embodiment of the present invention is configured to include meteorological observation devices 100, vehicles 200, a meteorological server 300, and a meteorological observation center 400.

The meteorological observation device 100 is embedded in the vehicle 200, and is configured to periodically detect surrounding weather information and photograph weather conditions.

An AVCS including radar devices for detecting the front and right and left sides, that is, sensors for supporting driving and preventing a collision, is mounted on the vehicle 200. The vehicle 200 runs on the road using the radar devices for detecting the front and right and left sides, and provides mobility to the embedded meteorological observation device 100.

The meteorological server 300 wirelessly collects pieces of weather information from the meteorological observation devices 100 of the vehicles 200 that move in areas, and provides the pieces of collected information to the meteorological observation center 400.

The meteorological observation center 400 (hereinafter referred to as the "meteorological observation sensor") uses information, received from the meteorological server 300, as statistical data or meteorological observation and forecast data.

Figure 3A:
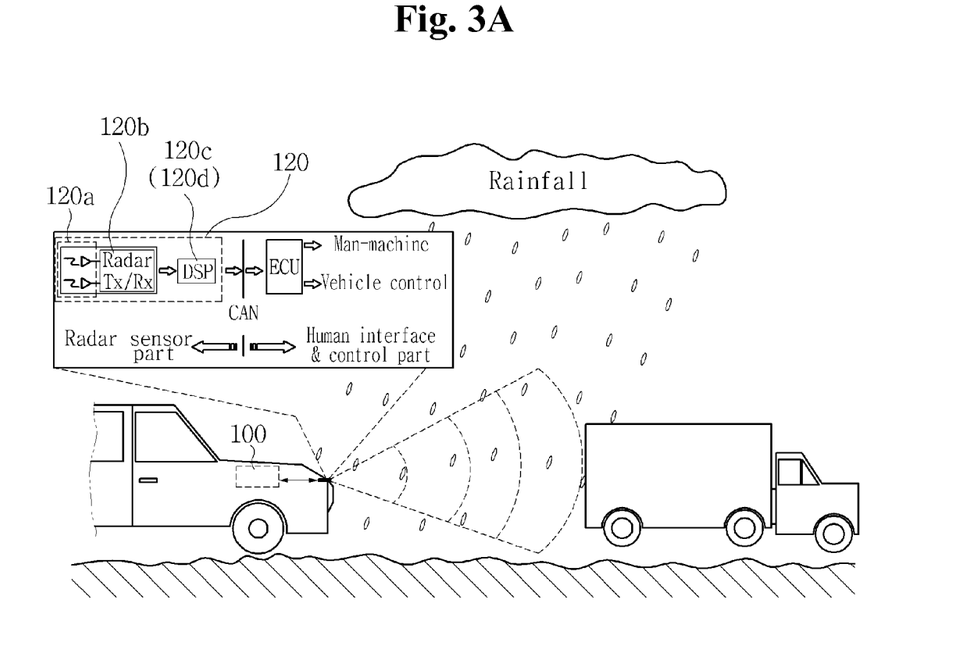
FIG. 3A is an exemplary diagram illustrating the meteorological observation device for a vehicle in accordance with an embodiment of the present invention.

FIG. 3A is an exemplary diagram illustrating the meteorological observation device for a vehicle in accordance with an embodiment of the present invention.

As shown in FIG. 3A, the meteorological observation device 100 in accordance with an embodiment of the present invention observes weather conditions (e.g., rainfall and snow fall) using the radar unit 120 of a vehicle. The radar unit 120 is a millimeter-wave radar for detecting the front and is chiefly mounted on a vehicle. The radar unit 120 determines a relative speed and distance between a vehicle being driven and another vehicle which is driven ahead of the vehicle being driven using the deviation and time difference of a Doppler frequency with the reflected wave of millimeter waves that have forward transmitted. The millimeter-wave radar for detecting the front may be used in various types of collision reduction and prevention systems for actuating a brake when the distance between vehicles is suddenly reduced and for reducing a collision or providing notification of a danger by giving the alarm and application technology that enable automotive driving.

Figure 2:
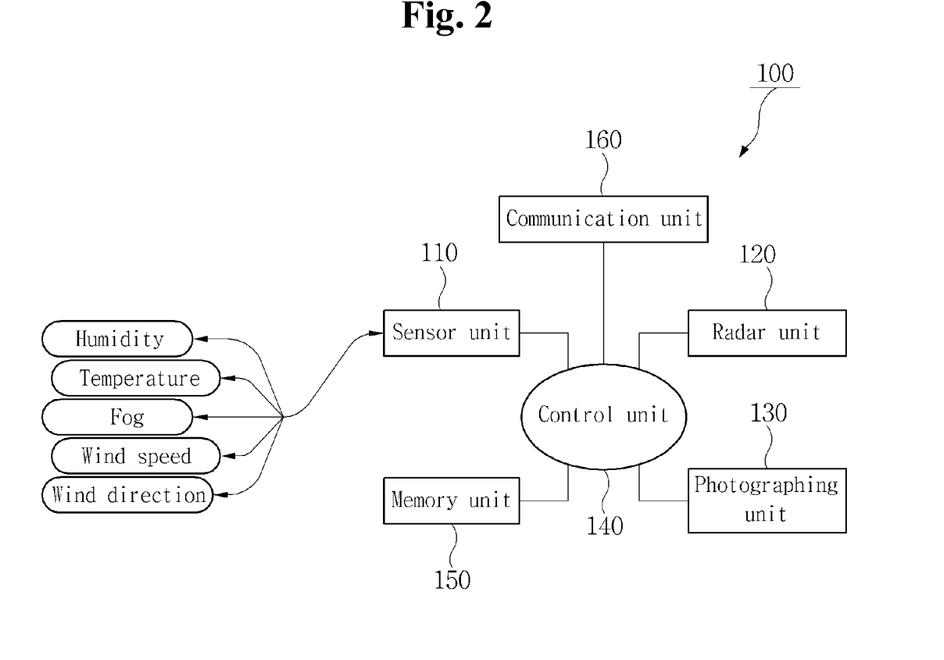
FIG. 2 is a block diagram illustrating the construction of a meteorological observation device for a vehicle in accordance with an embodiment of the present invention.

FIG. 2 is a block diagram illustrating the construction of the meteorological observation device for a vehicle in accordance with an embodiment of the present invention.

As shown in FIG. 2, the meteorological observation device 100 for a vehicle in accordance with an embodiment of the present invention is configured to include a sensor unit 110, the radar unit 120, a photographing unit 130, a control unit 140, a memory unit 150, and a communication unit 160. In the entire specification, unless explicitly described to the contrary, the word "include" will be understood to imply the inclusion of other elements but not the exclusion of any other elements. The same is true when any part "includes" any element.

The sensor unit 110 detects temperature, humidity, wind speed, and the direction of the wind around the vehicle. To this end, the sensor unit 110 may be configured to include a temperature sensor configured to detect temperature around the vehicle, a humidity sensor configured to detect humidity around the vehicle, a wind speed sensor configured to detect speed of the wind around the vehicle, and a wind direction sensor configured to detect the direction of the wind around the vehicle.

Figure 3B:
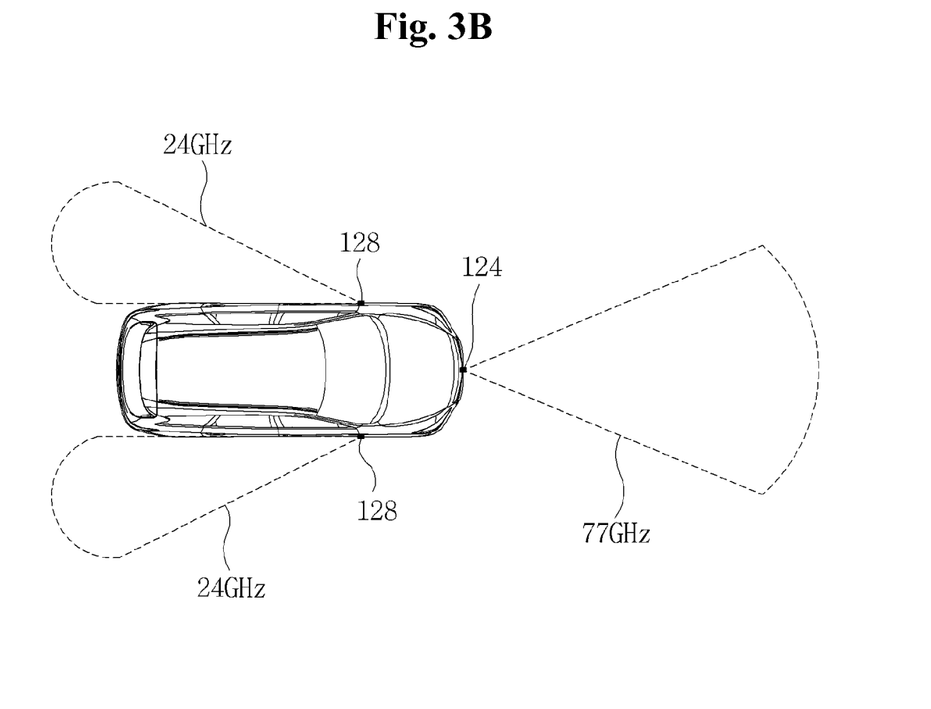
FIG. 3B is an exemplary diagram illustrating the direction and frequency of signals output by a radar unit.

The radar unit 120 is a millimeter-wave radar for detecting the front as described above. As shown in FIG. 3B, in order to measure the distance between a vehicle being driven and another vehicle which is driven ahead of the vehicle being driven, the radar unit 120 outputs a signal of a specific frequency toward the front or right and left of the vehicle.

The radar unit 120 is configured to include a first radar unit 124 configured to output a frequency of 77 GHz toward the front of the vehicle and second radar units 128 configured to output a frequency of 24 GHz toward the right and left of the vehicle.

The first radar unit 124 is provided on one side of the front part of the vehicle, and is configured to output the frequency of 77 GHz toward the front of the vehicle.

The second radar unit 128 is provided on one side of each of the left and right sides of the vehicle, and the second radar units output the frequency of 24 GHz toward the left and right sides of the vehicle.

The control unit 140 estimates the amount of rainfall (e.g., the amount of rainfall, the amount of snow fall, and fog) using the loss characteristic of a signal that is reflected and returned from an object (e.g., another vehicle) after radio waves (e.g., a radar signal having frequencies of 24 GHz and 77 GHz) output by the radar unit 120 collides against the object.

The control unit 140 in accordance with an embodiment of the present invention may estimate the amount of rainfall using four methods.

First, the control unit 140 may estimate the amount of rainfall (e.g., the amount of rainfall, the amount of snow fall, and fog) using the difference in the degree of attenuation in each frequency. The degree of attenuation per unit length (e.g., 1 km) may be estimated by dividing the difference between the pure reflectivity (or output power) and the measured return reflectivity (or measured power) of the radar unit by a measurement distance.

Second, the control unit 140 may estimate the amount of rainfall using the difference in the attenuation between two frequencies (e.g., 24 GHz and 77 GHz). The two frequencies (i.e., 24 GHz and 77 GHz) have different degrees of attenuation (i.e., the difference between the degrees of attenuation) depending on the amount of rainfall.

Third, the control unit 140 may estimate the amount of rainfall using the difference in the degree of attenuation between vertical and horizontal polarized waves in a single frequency (e.g., 24 GHz or 77 GHz). A raindrop maintains a circular form in weak rainfall, wherein a raindrop has an elliptical form in strong rainfall. Accordingly, in the same frequency, horizontal reflectivity and vertical reflectivity with respect to a raindrop have different attenuation characteristics depending on the amount of rainfall. In an embodiment of the present invention, the amount of rainfall may be estimated using the difference in the degree of attenuation according to such vertical and horizontal polarized waves.

Fourth, the control unit 140 may estimate the amount of rainfall using the difference in the attenuation between two frequencies (e.g., 24 GHz and 77 GHz) and the difference in the attenuation in each of the vertical and horizontal polarized waves of the two frequencies. In this estimation method, rainfall information may be computed by converging the first, second, and third methods.

Furthermore, the control unit 140 estimates the type of precipitation using the difference in the attenuation between two frequencies (e.g., 24 GHz and 77 GHz) and the difference in the attenuation in each of the vertical and horizontal polarized waves of the two frequencies. The degree of attenuation of each polarized wave in each frequency is different depending on weak rainfall or strong rainfall, snow fall, and fog. Accordingly, in the present invention, the type of precipitation is estimated using weak rainfall or strong rainfall, snow fall, and fog synthetically.

The photographing unit 130 photographs scenes around a vehicle being driven, and generates an image using the scenes so that the weather conditions of a corresponding area may be diagnosed.

The memory unit 150 stores weather information (e.g., the amount of rainfall, humidity, temperature, fog, wind speed, and the direction of the wind) detected by the sensor unit 110 and the control unit 140 and image information provided by the photographing unit 130.

The communication unit 160 sends information, stored in the memory unit 150, to the meteorological server 300 at a remote place. The communication unit 160 includes a communication module configured to communicate with the meteorological server 300. Wireless communication technologies that may be applied to the communication module may include a Wireless LAN (WLAN), Wi-Fi, Wireless broadband (Wibro), World Interoperability for Microwave Access (Wimax), and High Speed Downlink Packet Access (HSDPA).

FIG. 3B is an exemplary diagram illustrating the direction and frequency of signals output by the radar unit 120.

As shown in FIGS. 3A and 3B, each of the first and the second radar units 124 and 128 in accordance with an embodiment of the present invention is configured to include an antenna 120a, an RF unit 120b, a Digital Signal Processor (DSP) 120c, and a recognition unit 120d.

The antenna 120a sends the radar signal of the RF unit 120b into the air, and collects a signal that is reflected and returned from an object (e.g., another vehicle) after the radar signal collides against the object. The antenna 120a is fabricated in a GHz millimeter-wave radar front-end module integration type for outputting the radar signal received from the RF unit 120b and receiving a returned signal.

The RF unit 120b is an element configured to calculate the difference between a reference signal of GHz transmitted by a Voltage Controlled Oscillator (VCO) (not shown) and a signal collected by the antenna 120a. The VCO is a device configured to output a desired oscillating frequency using externally voltage, and is configured to receive a signal from a linearizer and output a reference signal near the center frequency 77 GHz (or 24 GHz).

The DSP 120c receives a signal collected (or scanned) by the RF unit 120b, and converts the received signal into a digital signal that may be processed by the meteorological observation device 100. The recognition unit 120d is embedded in the DSP 120c.

The recognition unit 120d is embedded in the DSP 120c, and is configured to analyze a radar signal. The recognition unit 120d computes the occupation probability of each lattice in a latticed display space by analyzing data, such as the distance from a signal measured by a radar sensor, the number of lobes, a band width, and a gain.

Figure 4:
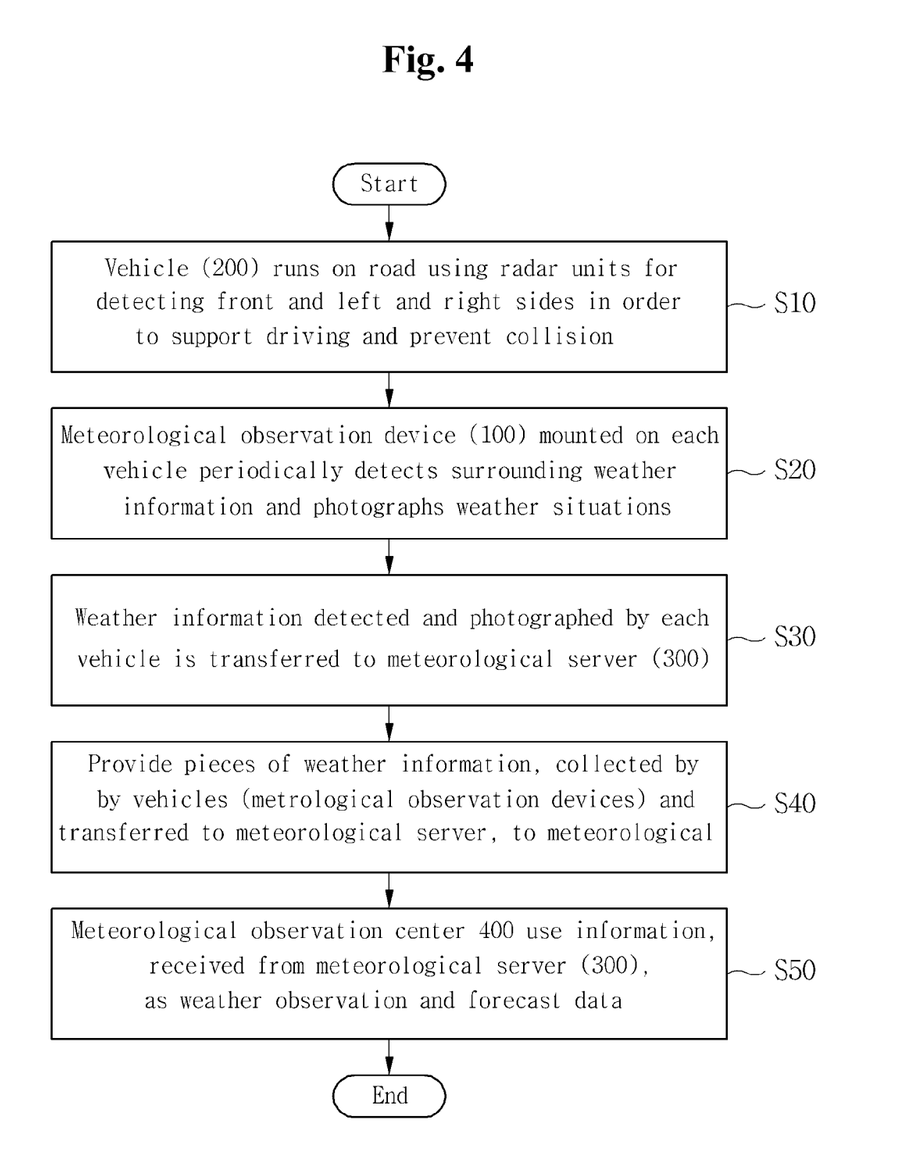
FIG. 4 is a flowchart illustrating a meteorological observation method using vehicles in accordance with an embodiment of the present invention.

FIG. 4 is a flowchart illustrating a meteorological observation method using vehicles in accordance with an embodiment of the present invention.

As shown in FIG. 4, each of the vehicles 200 on which the AVCS is mounted in accordance with an embodiment of the present invention runs on the road. The vehicle 200 runs on the road using the radar units for detecting the front and left and right sides of the AVCS in order to support driving and prevent a collision at step S10.

While the vehicle 200 runs on the road, the meteorological observation device 100 mounted on the vehicle 200 periodically detects surrounding weather information and photographs weather situations at step S20.

Figure 5:
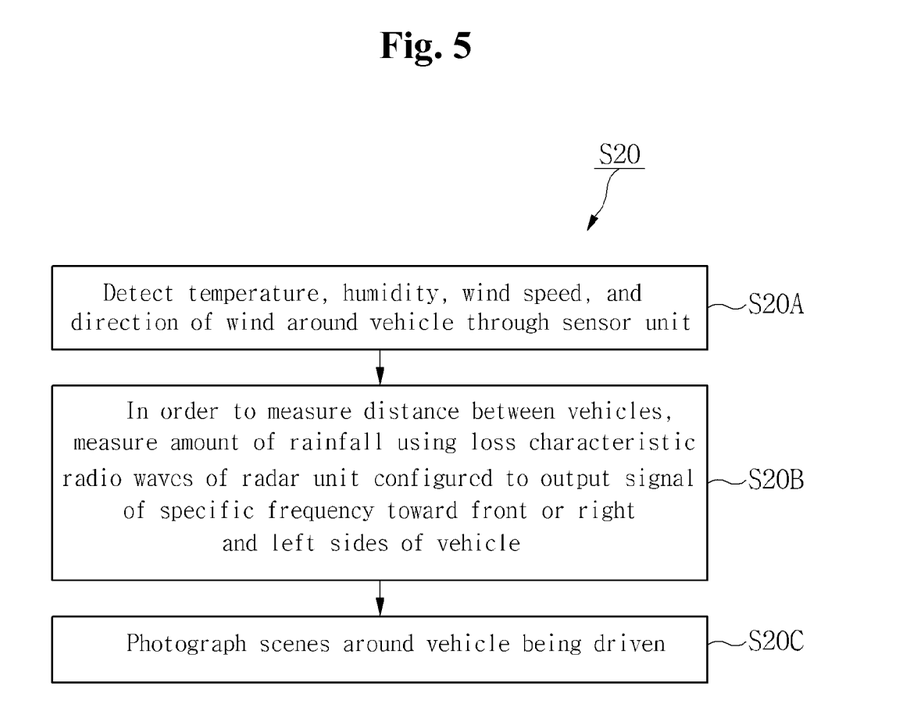
FIG. 5 is a detailed flowchart illustrating step S20 of FIG. 4.

FIG. 5 is a detailed flowchart illustrating step S20 of FIG. 4.

As shown in FIG. 5, first, the meteorological observation device 100 detects temperature, humidity, wind speed, and the direction of the wind around the vehicle through the sensor unit 110 at step S20A. Furthermore, in order to measure the distance between a vehicle being driven and another vehicle which is driven ahead of the vehicle being driven, the meteorological observation device 100 estimates the amount of rainfall using the loss characteristic of radio waves of the radar unit 120 configured to output a signal of a specific frequency toward the front or right and left sides of the vehicle being driven at step S20B.

Furthermore, the meteorological observation device 100 photographs scenes around the vehicle being driven and generates an image on which the weather conditions of a corresponding area may be diagnosed through the photographing unit 130 at step S20C.

The detected weather information (e.g., the amount of rainfall (or fog), temperature, humidity, wind speed, and the direction of the wind) and the captured image are stored in the memory unit 150, and are transmitted to the meteorological server 300 nearly through the communication unit 160 at step S30.

When the weather information and the captured images are collected by the vehicles 200 that run on areas, the meteorological server 300 provides the pieces of collected information to the meteorological observation center 400 at step S40.

Furthermore, the weather information and the captured images provided to the meteorological observation center 400 are used as weather-related statistical data or meteorological observation and forecast data at step S50.

At step S20B, in the present invention, the amount of rainfall may be estimated using four methods. The four methods of estimating the amount of rainfall are described in detail below.

The meteorological observation device 100 in accordance with an embodiment of the present invention estimates the amount of rainfall (e.g., the amount of rainfall, the amount of snow fall, and fog) using the loss characteristic of radar signals of 24 GHz and 77 GHz frequencies that are output by the radar unit 120 and that are reflected and returned from an object (e.g., another vehicle) after the radar signals collide against the object.

Furthermore, reflectivity of the radar signal is defined by Equation 1 below.

$$Z_{h,v}(r) = Z^m_{h,v}(r) + 2A_{h,v}(r) \qquad (1)$$

In Equation 1, "h" denotes a horizontal direction, and "v" denotes a vertical direction. $Z_{h,v}(r)$ is pure reflectivity prior to attenuation (Since a weather phenomenon (e.g., rainfall or snow fall) may be assumed to be uniform in a short distance of 100 m or less, $Z_{h,v}(r)$ may be said to be equal to the output signal), and $Z_{h,v}(r)$ is attenuated reflectivity, that is, measured (or returned) reflectivity. Furthermore, $2A_{h,v}(r)$ is a total amount of attenuation of a signal returned from the distance r.

Z(r) and A(r) have different characteristics in frequencies and horizontal and vertical polarized waves.

In an embodiment, a first method of estimating the amount of rainfall is to estimate the amount of rainfall (e.g., the amount of rainfall and the amount of snow fall) using the difference in the degree of attenuation in each frequency (e.g., 24 GHz or 77 GHz).

Attenuation per unit length (e.g., 1 km) may be estimated by dividing the difference between the pure reflectivity (or output power) and the measured return reflectivity (or measured power) of the radar unit by a measurement distance. For example, assuming that a signal (e.g., a frequency of 77 GHz) returned from a distance of 50 m has 20 dBZ (reflectivity unit) and has measured reflectivity of 18 dBZ, attenuation per unit length (1 km) is (20−18)/0.05=40 dB/km.

In an embodiment, a second method of estimating the amount of rainfall is to estimate the amount of rainfall using the difference in the attenuation between two frequencies.

The frequency of 24 GHz and the frequency of 77 GHz have different degrees of attenuation depending on the amount of rainfall. Accordingly, the degree of attenuation in each frequency is computed as in Equation 1, and the amount of rainfall is estimated based on the degree of computed attenuation.

Equation 2 below is an equation for estimating the amount of rainfall using the difference in the attenuation between two frequencies.

$$R=f(A^{24}(r),A^{77}(r),\Delta A(r)) \quad (2)$$

In Equation 2, R is the amount of rainfall, "f" is a function symbol, $A^{24}(r)$ is attenuation per unit length in a frequency of 24 GHz, $A^{77}(r)$ is attenuation per unit length in a frequency of 77 GHz, and $\Delta A(r)$ is the difference between $A^{77}(r)$ and $A^{24}(r)$ (i.e., $A^{77}(r)-A^{24}(r)$).

In an embodiment, a third method of estimating the amount of rainfall is to estimate the amount of rainfall using the difference in the degree of attenuation between vertical and horizontal polarized waves in a single frequency (e.g., 24 GHz or 77 GHz).

Figure 6:
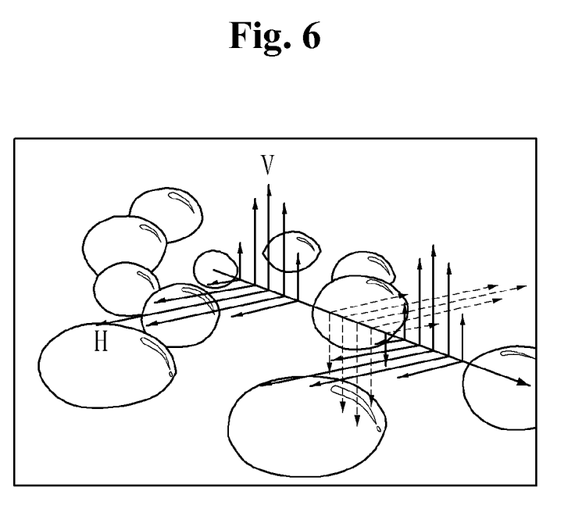
FIG. 6 is a diagram illustrating horizontal/vertical deviations according to the size and shape of raindrops.

A raindrop maintains a circular form in weak rainfall, whereas a raindrop has an elliptical form in a strong rainfall as shown in FIG. 6. Accordingly, in the same frequency, horizontal reflectivity and vertical reflectivity with respect to a raindrop have different attenuation characteristics depending on the amount of rainfall. In an embodiment of the present invention, the amount of rainfall may be estimated using the difference in the degree of attenuation according to such vertical and horizontal polarized waves. FIG. 6 is a diagram illustrating horizontal/vertical deviations according to the size and shape of raindrops.

Equation 3 below is an equation for estimating the amount of rainfall using the difference in the degree of attenuation in each of polarized waves in a single frequency.

$$R=f(A^{77}_h(r),A^{77}_v(r),\Delta A^{77}_{h,v}(r)) \quad (3)$$

In Equation 3, $A^{77}_h(r)$ is horizontal polarized wave attenuation per unit length in 77 GHz, $A^{77}_v(r)$ is vertical polarized wave attenuation per unit length in 77 GHz, and $\Delta A^{77}_{h,v}(r)$ is the difference between $A^{77}_h(r)$ and $A^{77}_v(r)$ (i.e., $A^{77}_h(r)-A^{77}_v(r)$).

In an embodiment, a fourth method of estimating the amount of rainfall is to estimate the amount of rainfall using the difference in the attenuation between two frequencies and the difference in the attenuation in each of the vertical and horizontal polarized wave of the two frequencies.

Figure 7:
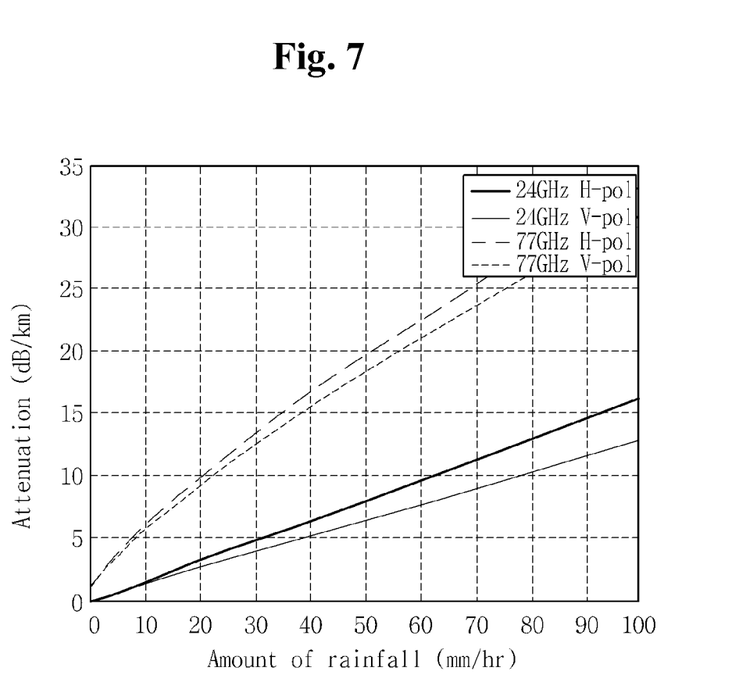
FIG. 7 is a graph illustrating the degree of attenuation between polarized waves in 24 GHz and 77 GHz according to the amount of rainfall.

FIG. 7 is a graph illustrating the degree of attenuation between polarized waves in the frequencies of 24 GHz and 77 GHz according to the amount of rainfall.

In an embodiment of the present invention, rainfall information may be computed by converging the first, the second, and the third methods. Equation 4 below is an equation for estimating the amount of rainfall using the difference in the attenuation between two frequencies (e.g., 24 GHz and 77 GHz) and the difference in the attenuation in each of vertical and horizontal polarized wave, as shown in FIG. 7.

$$R=f(A^{24}_h(r),A^{77}_h(r),\Delta A_h(r),A^{24}_v(r),A^{77}_v(r),\Delta A_v(r),\\ \Delta A^{24}_{h,v}(r),\Delta A^{77}_{h,v}(r)) \quad (4)$$

In an embodiment of the present invention, the type of precipitation may be estimated using the difference in the attenuation between two frequencies and the difference in the attenuation in each of polarized waves. The degree of attenuation in each of polarized waves in each frequency is different depending on weak rainfall, strong rainfall, snow fall, and fog. The type of precipitation may be estimated using a fuzzy theory by synthesizing the degrees of attenuation.

Equation 5 below is an equation based on a fuzzy theory for estimating the type of precipitation (e.g., weak rainfall, strong rainfall, snow fall, or fog) using the difference in the attenuation between two frequencies and the difference in the attenuation in each of polarized wave. In an embodiment of the present invention, the type of precipitation (e.g., weak rainfall, strong rainfall, snow fall, or fog) may be estimated by applying a fuzzy theory to 8 input parameters of Equation 5.

$$HD=h(A^{24}_h(r),A^{77}_h(r),\Delta A_h(r),A^{24}_v(r),A^{77}_v(r),\Delta A_v(r),\\ \Delta A^{24}_{h,v}(r),\Delta A^{77}_{h,v}(r)) \quad (5)$$

As described above, the present invention implements the meteorological observation system and method for collecting pieces of weather information detected and provided by vehicles which run on the roads across the country and for performing meteorological observations and forecast using the pieces of weather information.

Furthermore, the meteorological observation device and method for a vehicle are configured to estimate the amount of rainfall using the radar sensors for detecting the front and right and left sides, and the radar device of an existing AVCS is used for meteorological observation.

The meteorological observation system in accordance with an embodiment of the present invention collects and manages weather information (e.g., the amount of rainfall, humidity, temperature, fog, wind speed, and the direction of the wind) measured by a vehicle being driven. Accordingly, the vehicle can be actively used as means for meteorological observation, and thus a more precise and effective meteorological observation system can be provided.

The embodiments of the present invention have been illustrated with reference to the accompanying drawings, but they are only illustrative. Those skilled in the art will understand that the present invention may be modified in various ways and that all of or some of the embodiments may be selectively combined. Accordingly, the true scope of the invention should be determined by the following claims.

What is claimed is:

1. A meteorological observation system using vehicles, comprising:
   a vehicle;
   a meteorological observation device embedded in the vehicle and configured to periodically detect weather information and to photograph scenes around the vehicle;
   a meteorological server configured to collect the weather information from the meteorological observation device in the vehicle in an area corresponding to the meteorological server through wireless communication and to provide the weather information to a meteorological observation center, the meteorological observation center configured to receive the weather information from the meteorological server;
   wherein the meteorological observation device comprises:
   a sensor unit configured to detect temperature, humidity, wind speed, a direction of wind around the vehicle;
   a radar unit configured to output an output signal of a specific frequency toward front or right and left sides of the vehicle and to collect a reflected signal which is made after the output signal collides against an object around the vehicle in order to measure a distance between the vehicle and the object;
   a control unit configured to estimate an amount of rainfall or an amount of snow fall by using a loss characteristic of radar signals including the output signal and the reflected signal;
   a photographing unit configured to photograph the scenes around the vehicle and to generate image information corresponding to the scenes;

a memory unit configured to store the weather information including the temperature, the humidity, the wind direction of wind around the vehicle detected by the sensor unit and the amount of rainfall or the amount of snow fall estimated by the control unit and the image information generated by the photographing unit; and a communication unit configured to send the weather information stored in the memory unit to the meteorological server.

2. The meteorological observation system of claim 1, wherein the radar unit comprises:

a first radar unit configured to output a radio wave of a frequency of 77 GHz as the output signal toward the front side of the vehicle; and second radar units configured to output a radio wave of a frequency of 24 GHz as the output signal toward the left and right sides of the vehicle.

3. The meteorological observation system of claim 1, wherein the control unit is further configured to estimate the amount of rainfall by using a difference in a degree of attenuation of the radar signals of the specific frequency.

4. The meteorological observation system of claim 3, wherein the specific frequency is 24 GHz or 77 GHz.

5. A meteorological observation method using a vehicle, comprising the steps of:

preparing a vehicle on which an Advanced Vehicle Control System (AVCS) having a radar unit is mounted;

periodically detecting weather information around the vehicle and photographing scenes around the vehicle to generate image information corresponding to the scenes by a meteorological observation device embedded in the vehicle;

by a meteorological server, collecting the weather information and the image information from the meteorological observation device embedded in the vehicle in an area corresponding to the meteorological server through wireless communication; and providing the collected weather information and the collected image information to a meteorological observation center, wherein the step of detecting the weather information and photographing the scenes comprises:

detecting, by a sensor unit, temperature, humidity, wind speed, a direction of wind around the vehicle;

estimating an amount of rainfall by using a loss characteristic of a radar signal of a specific frequency output and collected by the radar unit, the radar unit configured to output a radio wave of a specific frequency as an output signal toward front or right and left sides of the vehicle and to collect a reflected signal which is made after the output signal collides against an object around the vehicle in order to measure a distance between the vehicle and the object; and photographing the scenes around the vehicle.

6. The meteorological observation method of claim 5, wherein the radar unit comprises:

a first radar unit configured to output a radio wave of a frequency of 77 GHz toward the front side of the vehicle; and second radar units configured to output a radio wave of a frequency of 24 GHz toward the left and right sides of the vehicle.

7. The meteorological observation method of claim 5, wherein the step of estimating the amount of rainfall comprises: estimating the amount of rainfall using a difference in a degree of attenuation of the radar signal of the specific frequency.

8. The meteorological observation method of claim 5, wherein the radar signal includes a first radar signal having a first frequency and a second radar signal having a second frequency, and the step of estimating the amount of rainfall comprises: estimating the amount of rainfall using a difference between an attenuation of the first radar signal and an attenuation of the second radar signal.

9. The meteorological observation method of claim 8, wherein the first frequency is 24 GHz and the second frequency is 77 GHz, and the step of estimating the amount of rainfall comprises: estimating the amount of rainfall using an equation below:

$$R=f(A^{24}(r),A^{77}(r),\Delta A(r))$$

wherein, R is the amount of rainfall, f is a function symbol, $A^{24}(r)$ is attenuation per unit length in the first frequency of 24 GHz, $A^{77}(r)$ is attenuation per unit length in the second frequency of 77 GHz, and $\Delta A(r)$ is a difference between $A^{77}(r)$ and $A^{24}(r)$ (i.e., $A^{77}(r)-A^{24}(r)$).

10. The meteorological observation method of claim 5, wherein the step of estimating the amount of rainfall comprises; estimating the amount of rainfall using a difference in a degree of attenuation between a vertical polarized wave of the radar signal and a horizontal polarized wave of the radar signal in a single frequency.

11. The meteorological observation method of claim 10, wherein the specific frequency of the radar signal is 24 GHz or 77 GHz, and the step of estimating the amount of rainfall comprises: estimating the amount of rainfall using an equation below:

$$R=f(A^{77}_h(r),A^{77}_v(r),\Delta A^{77}_{h,v}(r))$$

wherein, $A^{77}_h(r)$ is attenuation of the horizontal polarized wave per unit length in the frequency of 24 GHz or 77 GHz, $A^{77}_v(r)$ is attenuation of the vertical polarized wave per unit length in the frequency of 24 GHz or 77 GHz, and $\Delta A^{77}_{h,v}(r)$ is a difference between $A^{77}_h(r)$ and $A^{77}_v(r)$ (i.e., $A^{77}_h(r)-A^{77}_v(r)$).

* * * * *